(12) United States Patent
Yang

(10) Patent No.: US 6,181,243 B1
(45) Date of Patent: Jan. 30, 2001

(54) AUXILIARY AUTO SIGNLIGHT SYSTEM

(76) Inventor: Tzu Tsan Yang, 4517 Rip Van Winkle, Las Vegas, NV (US) 89102

( * ) Notice: Under 35 U.S.C. 154(b), the term of this patent shall be extended for 0 days.

(21) Appl. No.: 09/447,423

(22) Filed: Nov. 23, 1999

(51) Int. Cl.$^7$ .................................................. B60Q 1/26
(52) U.S. Cl. .................... 340/468; 340/471; 340/472; 340/475; 340/478; 340/479
(58) Field of Search .................... 340/468, 471, 340/472, 475, 478, 479

(56) References Cited

U.S. PATENT DOCUMENTS

| | | | |
|---|---|---|---|
| 3,903,629 | * | 9/1975 | Gruna ............................ 40/129 |
| 4,682,146 | * | 7/1987 | Friedman ........................ 340/77 |
| 4,758,931 | * | 7/1988 | Gabaldon ........................ 340/61 |
| 5,059,015 | * | 10/1991 | Tran ............................. 359/844 |
| 5,091,828 | * | 2/1992 | Jincks et al. ................... 362/35 |
| 5,124,845 | * | 6/1992 | Shimojo ......................... 340/760 |
| 5,361,190 | * | 11/1994 | Roberts et al. .................. 340/461 |
| 5,587,699 | * | 12/1996 | Faloon et al. ................... 340/475 |
| 5,774,283 | * | 6/1998 | Nagel et al. .................... 340/475 |
| 5,788,357 | * | 8/1998 | Muth et al. ..................... 362/83.1 |
| 5,988,839 | * | 11/1999 | Pokorney et al. ................. 362/493 |
| 6,043,739 | * | 3/2000 | Henderson ....................... 340/468 |
| 6,045,243 | * | 4/2000 | Muth et al. ..................... 362/494 |

\* cited by examiner

Primary Examiner—Daniel J. Wu
Assistant Examiner—Son Tang
(74) Attorney, Agent, or Firm—Raymond Y Chan; David and Raymond

(57) ABSTRACT

An auxiliary auto signlight system providing an auxiliary turn signal light, brake signal light, taillight, SOS emergency signal light includes a strobe module mounted on an upper portion of an interior of rear windshield, at least nine strobes are mounted thereon, and a signal device and a supplementary emergency are separately mounted on the side mirror housing for further signal indication. The auxiliary auto signlight system is equipped with an existing vehicle without any alteration of the vehicle that will highly increase the liability of driving.

4 Claims, 4 Drawing Sheets

AUXILIARY AUTO SIGNLIGHT SYSTEM

BACKGROUND OF THE PRESENT INVENTION

1. Field of Invention

The present invention relates to a signlight system, and more particularly to an auxiliary auto signlight system that provides an innovative auxiliary lighting in an automotive in order to highly increase the liability of driving.

2. Description of Related Arts

Thousands of accidents occur everyday because of the drivers' careless. Accidents usually occur when drivers want to cut lane on the road or back up in the parking lot without a significant signal so that collisions may happen between vehicles. Moreover, when the driver is in danger such as being chased or the vehicle suddenly broken down on the freeway, an emergency light on the vehicle should be significantly switched on to awake people in the surroundings. So, a panel of signlight such as turn, brake, and hazard warning signlight is important to a vehicle for attracting people's attention by the designated signals.

Referring to FIG. 1 of the drawing, a conventional auto signlight system is illustrated. The conventional auto signlight system installed at a rear panel 2 of a vehicle comprises a pair of turn signal lights 3 each having a yellow illuminator for signifying the right and left turn of the vehicle, a pair of brake lights 4 each having a red illuminator for signifying the deceleration of the vehicle wherein an auxiliary third brake 5 light having a bar shape is installed at the bottom of the middle of the rear windshield 6, a pair of backup signal lights 7 each having a white illuminator for signifying the vehicle is in the reverse gear, and a pair of hazard warning lights 8 each having the same yellow illuminator of the turn signal light 3 which are twinkled at two outermost ends of the rear panel 2 respectively.

Since the conventional auto signlight system is installed at the lower portion of the vehicle which is the rear panel 2 of the vehicle, other drivers may hard to aware of the immediate signals especially at some conditions such as in rainy day or winding road. Furthermore, the hazard warning lights 8 flashing at two ends of the rear panel 2 are not shape enough for people to recognize the emergency of the driver especially when the hazard warning lights 8 are hidded by other vehicle. Worse, driver does not have other alternative method but the hazard warning light 8 for signifying he or she is in danger while people will just think the vehicle is broken down.

SUMMARY OF THE PRESENT INVENTION

The main object of the present invention is to provide an auxiliary auto signlight system which is adapted for signifying the further motion of a vehicle clearly.

Another object of the present invention is to provide an auxiliary auto signlight system having a "SOS" emergency signlight which is adapted for strongly signifying the driver is in danger and needs help.

Another object of the present invention is to provide an auxiliary auto signlight system which is easy to install to an existing vehicle and in low cost.

Another object of the present invention is to provide an auxiliary auto signlight system which is reliable and highly effective strobe product to a vehicle.

Another object of the present invention is to provide an auxiliary auto signlight system which can be equipped with an existing vehicle without any alteration of the vehicle.

Accordingly, in order to accomplish the above objects, the present invention provides an auxiliary auto signlight system, which comprises:

a strobe module mounted on an upper portion of an interior of a rear windshield;

a plurality of strobes each having a replaceable lighting element base serially mounted on the strobe module;

a plurality of lighting elements replaceable mounted on the lighting element bases inside the strobes respectively; and a plurality of signlights each having at least a lighting element mounted inside a side mirror housing.

Moreover, at least nine strobes are mounted on the strobe module. The configuration of the each strobe represents from two outermost ends to the center is a turn signal light, a taillight, a brake signal light, and a back-up signal light respectively and the center one represents a "SOS" emergency light, wherein different colors are shown on the strobe with respect to different signal lights when illuminating.

DETAILED DESCRIPTION OF THE PREFERRED EMBODIMENT

Figure 1:
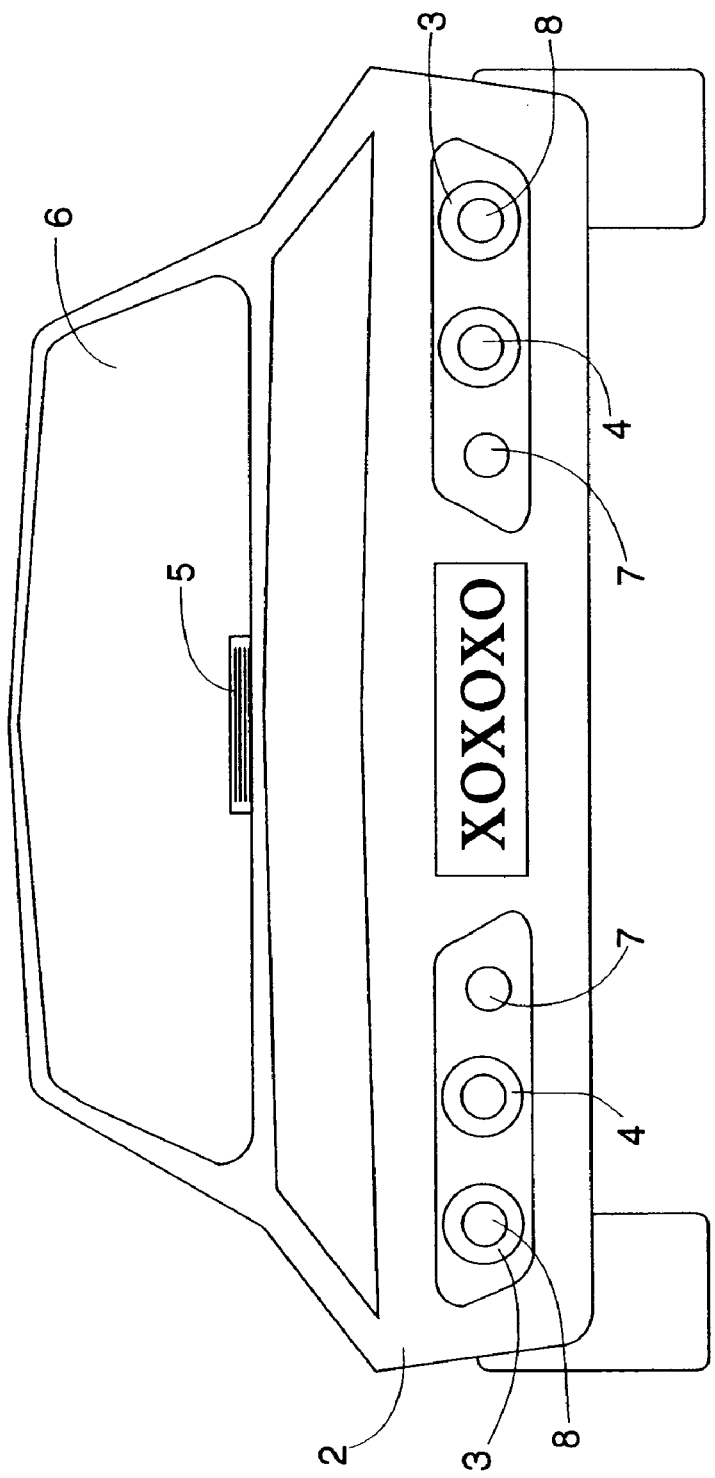
FIG. 1 is a rear view of a vehicle illustrating the conventional auto signlight system.
Figure 2:
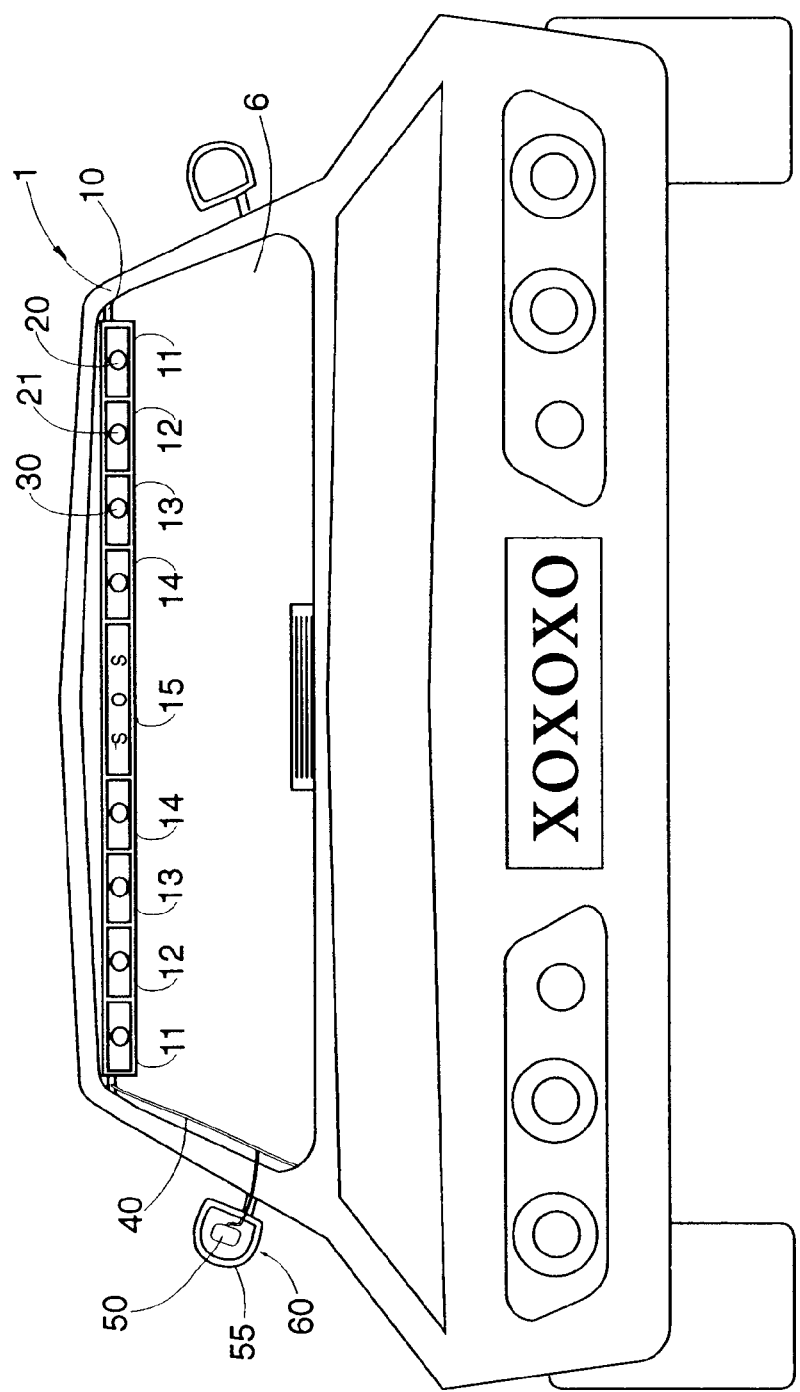
FIG. 2 is a rear view a vehicle illustrating an auxiliary auto signlight system according to a preferred embodiment of the present invention.

Referring to FIG. 2 of the drawing, an auxiliary auto signlight system 1 according to a preferred embodiment of the present invention is illustrated. The auxiliary auto signlight system 1 is installed at an upper portion of an interior rear windshield 6 in such a manner that the auxiliary auto signlight system 1 will not block the rear view from the driver while driving. Moreover, the auxiliary auto signlight system 1 is adapted for equipping with the conventional signlight system of an existing vehicle without any alteration. So, for example, both right turn signal lights on the auxiliary auto signlight system 1 and the conventional signlight system will switch on or off at the same time.

The auxiliary auto signlight system 1 for a vehicle comprises a strobe module 10 mounted on the upper portion of the interior of rear windshield 6, a plurality of strobes 20 each having a replaceable lighting element base 21 serially mounted on the strobe module 10, a plurality of lighting elements 30 such as light bulb or LED replaceably mounted on the lighting element bases 21 inside the strobes 20 respectively, and a connecting means 40 for electrically connected between the strobe 20 of the strobe module 10 and a power outlet of the vehicle for conducting electricity.

At least nine strobes 20 are mounted on the strobe module 10, arranging from two outermost ends are a pair of turn signal lights 11, two interior ends next to the turn signal lights are a pair of taillights 12, two interior ends next to the taillights are a pair of brake signal lights 13, and two interior ends next to the brake signal lights are a pair of back-up signal lights 14 respectively and a center strobe having a SOS logo printed thereon represents an emergency light 15. The emergency light 15 has a size bigger than other strobes is adapted for strongly signifying the emergency signal.

Furthermore, the conventional signlight system installed in the vehicle has different illuminated colors to indicate different signal such as turn signal light having a flashing yellow illuminator. The auxiliary auto signlight system 1 has the same configuration of the conventional signlight system, wherein a flashing yellow illuminator for the turn signal light 11 is indicated when the turn signal switch is turned on, a white illuminator is indicated for the taillight 12, a red illuminator for the brake signal light 13 will be brightened when the driver hit the brake paddle, a white illuminator for the backup signal light 14 will be brightened when the vehicle is in reverse gear, and a purple illuminator is flashing when the emergency signal light 15 is switched on. It is worth to mention that the emergency signal light 15 having a SOS logo will be flashed when the switch is on and the SOS signal will significantly notice people in the surrounding that the driver is in emergency.

Figure 3:
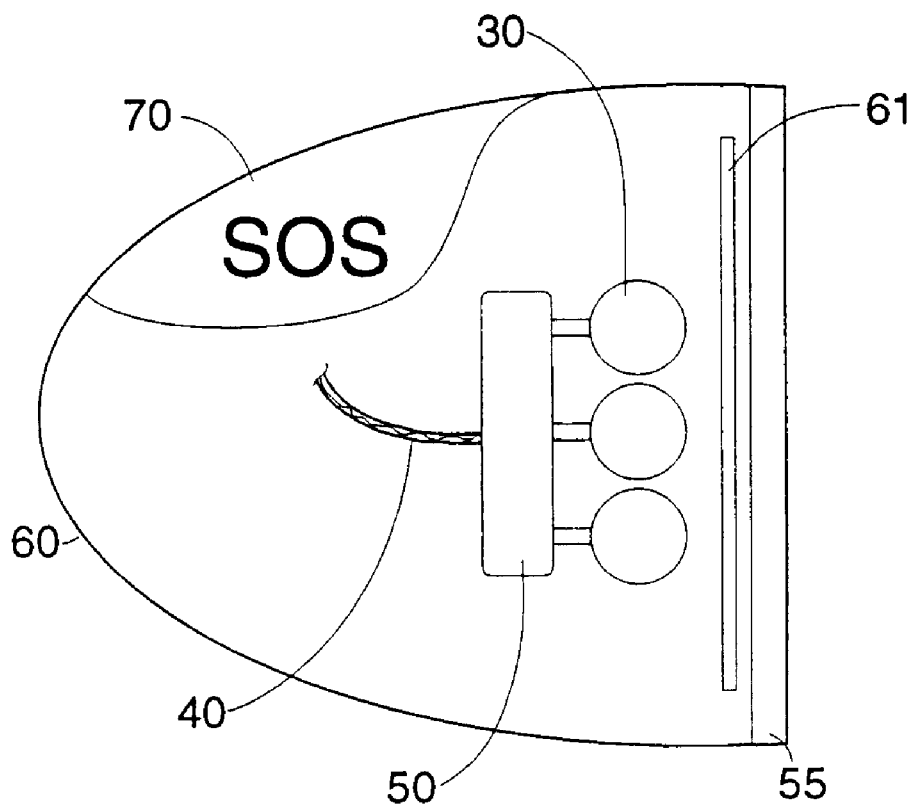
FIG. 3 is an enlarged schematic view of a side mirror housings as shown in FIG. 2, according to the above preferred embodiment of the present invention.

As shown in FIGS. 2 and 3, the auxiliary auto signlight system 1 further comprises the signal device 50 mounted inside a side mirror housing 60 wherein the signal device 50 has at least a colored lighting element 30 detachably mounted thereon and connected to the connecting means 40 which comprises electrical wires. A transparent cap 55 having a ring shaped is mounted at a back portion of the side mirror housing 60 to provide a peripheral light passage to encircle the, as shown in FIG. 3 side mirror 61. So, when the lighting element 30 inside the signal device 50 is flashing or brightened, the lighting element light will pass around the side mirror 61 and through the transparent cap 55 to outside and give a signal to other vehicle at the side which is unable to catch the signal at the rear portion of the vehicle. Also, the signal device 50 may have more lighting elements 30 to illuminate different colors such as yellow and red for indicating different signals such as turn and brake corresponding to the configuration of the strobe 20 light of the auxiliary auto signlight system 1.

Referring to FIG. 3 of the drawing, a supplementary emergency light 70 having a "SOS" logo mounted on each of an upper and front portion of the side mirror housing 60, wherein the supplementary emergency light 70 is adapted for noticing the emergency signal to the people at the front and side view of the vehicle while the "SOS" emergency light 15 is adapted for noticing the emergency signal to the people at the back and side view of the vehicle. So, people at every view of the vehicle are able to notice the emergency signal.

Figure 4:
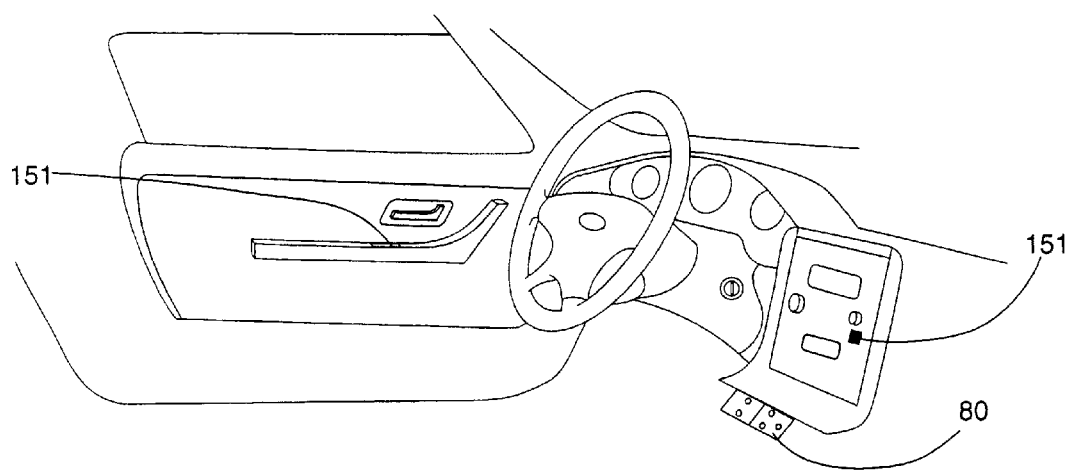
FIG. 4 is a partially interior perspective view of a vehicle according to the above preferred embodiment of the present invention, illustrating a plurality of switch is installed at the dashboard and the armrest of the interior of the vehicle for turning on both the "SOS" emergency light and the supplementary emergency light.
Figure 5:
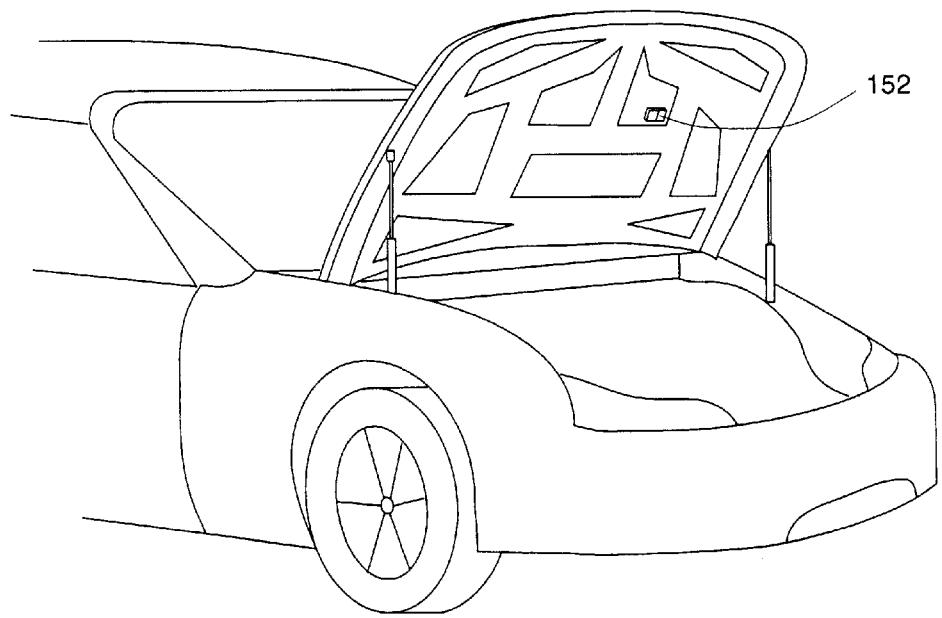
FIG. 5 is partially perspective view of a vehicle according to the above preferred embodiment of the present invention, illustrating a switch is installed under the hood for turning off both the "SOS" emergency light and the supplementary emergency light.

Furthermore, a plurality of switches 151, as shown in FIG. 4, for turning on both the "SOS" emergency light 15 and the supplementary emergency light 70 are installed at designated places inside the vehicle such as the dashboard or armrest for easy reaching so that the driver and passengers are able to turn on the "SOS" emergency light 15 and the supplementary emergency light 70 immediately when necessary. A switch 152, as shown in FIG. 5, for turning off both the "SOS" emergency light 15 and the supplementary emergency light 70 is installed under the hood for further safety protection. In order to turn off the emergency lights, the hood in the front of the vehicle must be open first and then turn on and off the switch 152 under the hood. In other words, people cannot turn off the emergency lights inside the vehicle. So, the driver and the passengers will not be threatened to turn off the emergency which may save their lives.

A parallel power cord 80 is extended from the wire 40 in order to supple electricity for further usage of the electrical products such as a small refrigerator or a mini-television adapted for installing in the vehicle by easily plugging in to the parallel power cord 80.

What is claimed is:

1. An auxiliary auto signlight system, comprising:

a strobe module mounted on an upper portion of an interior of rear windshield of a vehicle;

a plurality of strobes each having a replaceably lighting element base serially mounted on said strobe module;

a plurality of lighting elements replaceably mounted on said lighting element bases inside said strobes respectively;

a pair of supplementary lights each having a "SOS" logo are mounted on upper and front portions of two side mirror housings of said vehicle respectively;

a connecting means for electrically connecting said strobe of said strobe module and a power outlet of a vehicle for conducting electricity; and a switch for turning off both said emergency light and said supplementary emergency lights is installed under a hood of said vehicle.

2. An auxiliary auto signlight system, comprising:

a strobe module mounted on an upper portion of an interior of rear windshield of a vehicle;

a plurality of strobes each having a replaceably lighting element base serially mounted on said strobe module;

a plurality of lighting elements replaceably mounted on said lighting element bases inside said strobes respectively;

a pair of supplementary lights each having a "SOS" logo are mounted on upper and front portions of two side mirror housings of said vehicle respectively;

a pair of signal devices mounted inside said two side mirror housings respectively, wherein each of said signal device comprises at least a lighting element detachably mounted thereon and a transparent cap having a ring shape mounted at a back of said respective side mirror housing to provide a peripheral light passage to encircle said respective side mirror housing, wherein a flashing and brightened lighting element light emitted from said lighting element of said respective signal device passes around said respective side mirror and through said respective transparent cap to outside;

a connecting means for electrically connecting said strobe of said strobe module and said lighting elements of said signal devices and a power outlet of a vehicle for conducting electricity; and a switch for turning off both said emergency light and said supplementary emergency lights is installed under a hood of said vehicle.

3. An auxiliary auto signlight system, comprising:

a strobe module mounted on an upper portion of an interior of rear windshield of a vehicle;

a plurality of strobes each having a replaceably lighting element base serially mounted on said strobe module;

a plurality of lighting elements replaceably mounted on said lighting element bases inside said strobes respectively, wherein said plurality of strobes mounted on said strobe module include a pair of taillights arranging from two outermost ends of said strobe module, a pair of bake signal lights arranging at two interior ends of said strobe module next to said taillights, a pair of back-up signal lights arranging at two interior ends of said strobe module next to said brake signal lights respectively, and a center strobe having a "SOS" logo printed thereon representing an emergency light;

a connecting means for electrically connecting said strobe of said strobe module and a power outlet of a vehicle for conducting electricity; and a plurality of switches for turning on said emergency light, which are installed at designated places inside said vehicle for easy reaching, wherein one of said switches is installed under a hood of said vehicle.

4. An auxiliary auto signlight system, comprising:

a strobe module mounted on an upper portion of an interior of rear windshield of a vehicle;

a plurality of strobes each having a replaceably lighting element base serially mounted on said strobe module;

a plurality of lighting elements replaceably mounted on said lighting element bases inside said strobes respectively;

a pair of signal devices mounted inside said two side mirror housings respectively, wherein each of said signal device comprises at least a lighting element detachably mounted thereon and a transparent cap having a ring shape mounted at a back of said respective side mirror housing to provide a peripheral light passage to encircle said respective side mirror housing, wherein a flashing and brightened lighting element light emitted from said lighting element of said respective signal device passes around said respective side mirror and through said respective transparent cap to outside; and a connecting means for electrically connecting said strobe of said strobe module and said lighting elements of said signal devices and a power outlet of a vehicle for conducting electricity.

* * * * *